United States Statutory Invention Registration [19]

[11] Reg. Number: H981

Venkatachari et al. [43] Published: Nov. 5, 1991

[54] PROCESS FOR SELECTIVE GRINDING OF COAL

[75] Inventors: Mukund K. Venkatachari, San Francisco; August D. Benz, Hillsborough; Horst Huettenhain, Benicia, all of Calif.

[73] Assignee: The United States of America as represented by the United States Department of Energy, Washington, D.C.

[21] Appl. No.: 398,576

[22] Filed: Aug. 25, 1989

[51] Int. Cl.[5] ..... C10L 1/32

[52] U.S. Cl. ..... 44/282; 44/500; 209/172; 209/172.5; 241/16; 241/20

[58] Field of Search ..... 44/500; 241/16, 20; 209/172, 172.5

[56] References Cited

U.S. PATENT DOCUMENTS

| | | | |
|---|---|---|---|
| 4,173,530 | 11/1979 | Smith et al. | 209/172 |
| 4,244,699 | 1/1981 | Smith et al. | 44/629 |
| 4,405,453 | 9/1983 | Wells | 209/172.5 |
| 4,500,041 | 2/1985 | Nakaoji et al. | 241/16 |
| 4,522,626 | 6/1985 | Epsenscheid | 44/604 |
| 4,533,464 | 8/1985 | Smith et al. | 209/172.5 |

*Primary Examiner*—Brooks H. Hunt
*Assistant Examiner*—Daniel J. Jenkins
*Attorney, Agent, or Firm*—Hugh W. Glenn; Robert J. Fisher; William R. Moser

[57] ABSTRACT

A process for preparing coal for use as a fuel. Forming a coal-water slurry having solid coal particles with a particle size not exceeding about 80 microns, transferring the coal-water slurry to a solid bowl centrifuge, and operating same to classify the ground coal-water slurry to provide a centrate containing solid particles with a particle size distribution of from about 5 microns to about 20 microns and a centrifuge cake of solids having a particle size distribution of from about 10 microns to about 80 microns. The classifer cake is reground and mixed with fresh feed to the solid bowl centrifuge for additional classification.

20 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR SELECTIVE GRINDING OF COAL

CONTRACTUAL ORIGIN OF THE INVENTION

The U.S. Government has rights in this invention pursuant to Contract No. DE-AC22-87PC79867 between the U.S. Department of Energy and Bechtel National, Inc.

BACKGROUND OF THE INVENTION

This invention relates to a method or process of selectively grinding coal to liberate mineral and ash matter entrained with coal and to provide a particle distribution which is in a well defined and relatively narrow range. Modern coal mining and coal cleaning techniques are generating increasing quantities of degraded coal materials. Coal preparation plants produce large quantities of crushed coal and refuse with high water or moisture content. There has been a substantial effort by the Department of Energy to determine effective methods of cleaning coal, of agglomerating the coal into pellets using effective binders. One such agglomeration process is disclosed in U.S. Pat. No. 4,615,712 issued to Wen, Oct. 7, 1986 and assigned to the United States of America as represented by the U.S. Department of Energy, the disclosure of which is incorporated herein by reference.

Traditionally, coal crushed to a size below 150 or even 50 mm has been physically cleaned and is substantially reduced of minerals such as pyrite and ash. Generally, advanced cleaning may be accomplished by physically grinding coal to separate the mineral and ash from the coal particles. Theoretically, fine grinding of coal will result in substantially all of the ash and minerals such as pyrites being free of coal particles.

A problem inherent in grinding of coal is that a portion of the coal in any grinding apparatus is ground to a finer degree than other portions of the coal. For instance, coal passing through a 200 mesh screen may typically contain various particle sizes up to about 80 microns. The particle size distribution may vary considerably but it will be the larger particles for the most part, which contain both pyrite and coal as well as coal and ash. Inefficiencies are introduced in the system by virtue of regrinding coal which is already ash free or pyrite free or coal which has particles in the desired range. Regrinding is expensive and results in particles which are finer than desired and are more difficult to work with later in the process.

Physical coal cleaning involve two distinct steps. The initial size reduction step prepares the coal by crushing, grinding or micronizing in order to liberate the ash and the pyrite. Size reduction by physical crushing produces a mixture consisting of discrete particles of low ash coal and particles high in ash or pyrite. Thereafter, the mixture of discrete particles of low ash coal and the particles with either high ash or pyrite are segregated into clean coal and into refuse product. The separation step may be accomplished by specific gravity separation, froth flotation methods or by agglomeration methods which are known and do not form part of this invention. This invention relates to an improved and more efficient grinding process for producing coal particles having a size distribution in the range of from about 5 microns to about 20 microns and which produces particles which are substantially free of minerals such as pyrites and ash, without excessive grinding.

Heretofore, reduction of coal to micron sizes has been accomplished with an attrition mill which consists of a cylindrical vessel fitted with an agitator and filled with a hard grinding media such as ceramic or iron shot. The feed consisting of a coal slurry and water containing both large and small particles some of which are high in ash and some of which are high in pyrite content is introduced at one end of the vessel. As the agitator turns, the grinding media disintegrates the particles of coal in the feed slurry by attrition. The ground slurry exits at the opposite side of the vessel which is fitted with a screen to prevent the grinding media leaving the mill with the slurry.

The single pass agitator mill method of crushing or grinding coal is unsatisfactory because the ground product may have an average particle size which is acceptable, say in the 20 microns range, but the particles themselves may have a wide size distribution from submicron size to as high as 160 microns. Examination of the particles shows that the finest particle sizes are predominantly made up of ash-free coal and pyrite-free coal, while the coarser sizes contain coal with high ash and pyrite contents. The characteristics of the ground product from attrition mills reduces the efficiency of the micronizing and cleaning operations as well as the dewatering and water treatment steps. Overgrinding increases the difficulty of recovering the products, dewatering the products and clarifying the water for environmental purposes. And, if the high ash and high pyrite-containing coal particles are to be reduced to the required size in a single pass, the entire feed stock must be ground even more finely thereby not only increasing the grinding cost but also aggravating the problems aforesaid.

SUMMARY OF THE INVENTION

Accordingly, it is a principal object of the present invention to provide a process of achieving the required level of liberating ash and minerals such as pyrites from coal feed stock with a minimum size reduction.

Another object of the invention is to provide a process for micronizing coal which provides a product having relatively narrow size distribution and in which both over and under micronizing are avoided.

Another object of the invention is to provide a process for preparing coal for use as a fuel, comprising grinding coal particles in the presence of water to form a coal-water slurry having solid coal particles with a particle size not exceeding about 80 microns, classifying the ground coal-water slurry in a solid bowl centrifuge to provide a centrate containing solid particles with a particle size distribution of from about 5 microns to about 20 microns and to provide a centrifuge cake of solids having a particle size distribution from about 10 microns to about 80 microns, and regrinding the classifier cake.

A final object of the invention is to provide a continuous process for preparing coal for use as a fuel, comprising grinding coal particles in the presence of water to form a coal-water slurry having solid coal particles present in an amount of about 30% by weight with a particle size not exceeding about 80 microns, classifying the ground coal-water slurry in a solid bowl centrifuge to provide a centrate containing solid particles present in a concentration greater than about 10% by weight with a particle size distribution not to exceed about 20 microns and to provide a centrifuge cake of solids having a particle size distribution of from about 10 microns to about 80 microns, and regrinding the centrifuge cake, and introducing the reground cake having particle sizes not exceeding about 50 microns and water with fresh feed to the solid bowl centrifuge for classification to produce a centrate having solids with a particle size distribution not to exceed about 20 microns.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a testing arrangement thereof, from an inspection of which, when considered in connection with the following description, the invention, its construction and operation, and many of its advantages should be readily understood and appreciated.

DESCRIPTION OF THE PREFERRED EMBODIMENT

Figure 1:
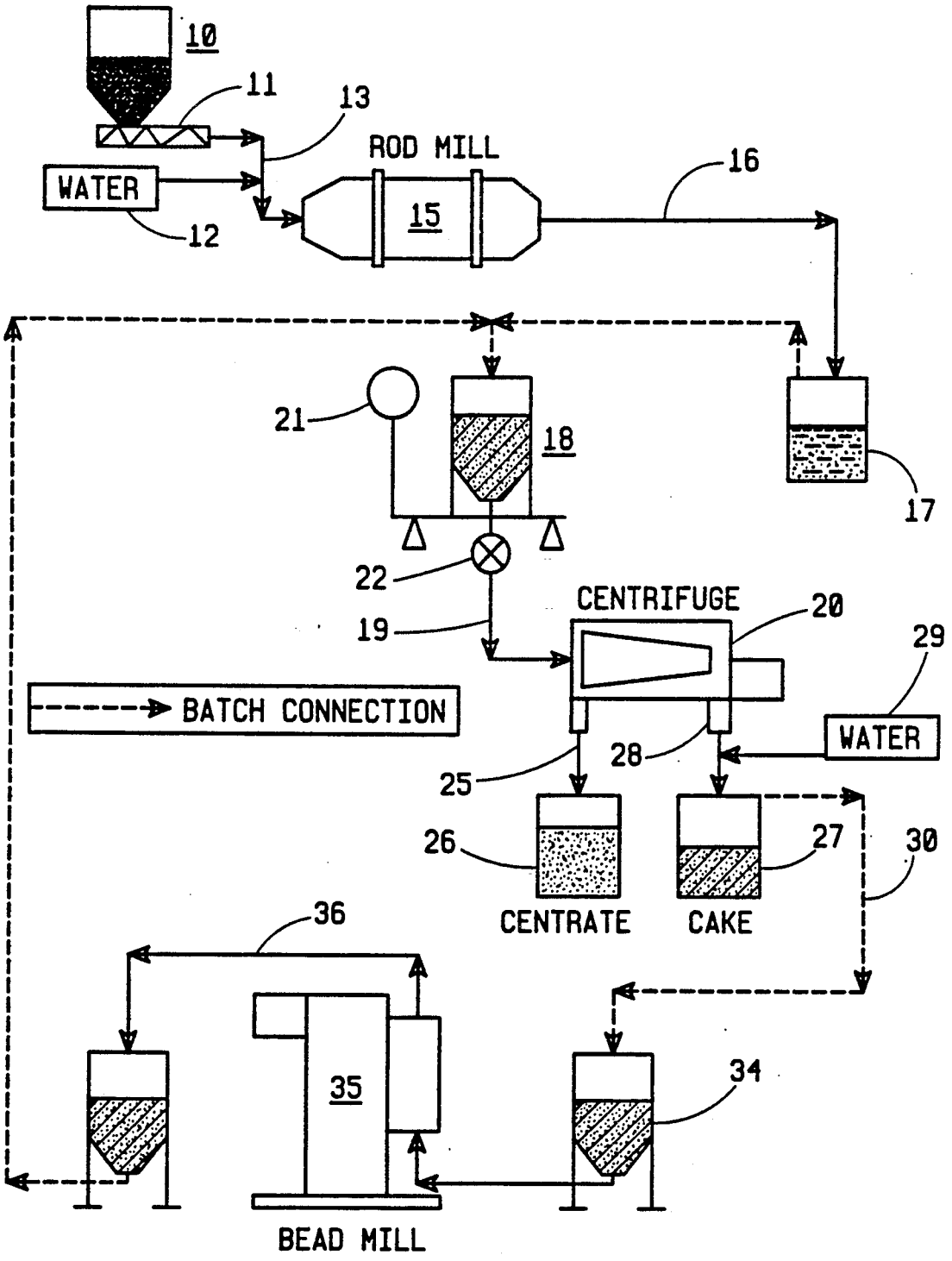
FIG. 1 is a flow diagram of a process for selectively grinding coal.

A source of coal 10 is connected by a conveyor 11 to a source of water 12 which forms a slurry in line 13 and is introduced to a rod mill 15 at one end thereof. The outlet from the rod mill 15 leads to an accumulator 17 and therefrom to a tank 18, the outlet 19 of which is connected to a solid bowl centrifuge 20. A scale 21 and suitable valve 22 are provided to establish or interrupt a measurable communication between the material in the vessel 18 and the centrifuge 20. The centrifuge 20 may be one of several solid bowl centrifuges commercially available such as by Bird Machine Co. The centrifuge 20 is operated as a classifier which separates particles having a size distribution in the range of from submicron size up to about 20 microns size which exits the centrifuge 20 via a line 25 to a collection vessel 26 for the centrate. Depending on the operation characteristics of the classifier or centrifuge 20 the solids contents in the centrate may range from about 5% to upwards of 15% by weight. The centrifuge cake 27 exits from the centrifuge via outlet 28 and may be reformed as slurry by the introduction of water from a source of water 29 and transferred through a pipe 30 to a bead mill 35 through a feed bin 34. The bead mill 35 is a grinding apparatus capable of grinding to finer particle sizes for instance less than about 50 microns than is the rod mill 15 initially used in the grinding process. The reground centrifuge cake leaves the bead mill 35 via an outlet 36 and is transported to the vessel 18 and hence to the solid bowl centrifuge classifier 20.

By this method, it is possible to avoid over grinding coal particles which are already substantially ash free and pyrite free because the selection process depends principally on centrifugal force. The centrifugal force will separate both as to particle size and as to weight. With respect to particle size, it has been found as described above, that smaller particles tend to be more ash free and more mineral and pyrite free. Particles high in pyrite content tend to be heavier and so that the heavier particles and the larger particles tend to be segregated and recycled to the bead mill 35 for additional grinding. This method accordingly separates the particles which are substantially mineral free and ash free from those particles which need additional grinding to clean the particles, thereby preventing regrinding of particles which are already clean. The centrate 26 is thereafter transported to a suitable cleaning facility (not shown) which will separate the tailings including coal of high ash content and mineral particles from the clean coal. The clean coal is thereafter treated and formed into the appropriate fuel for transport and storage and then for combustion. The feed size distribution for the two types of coal used in the various examples are set forth in Table 1.

In testing the inventive process, a solid bowl centrifuge, model 0250 was obtained from Bird Machine Company and two types of ground coal were made available. One coal was from Illinois No. 6 seam and the other was a Splint coal. All coal was ground in the rod mill 15 to a nominal size of minus 200 mesh, that is approximately 80% of the coal had particle diameters of about 76 microns or less. The centrifuge 20 was operable as either a decanter or a classifier depending on operation characteristics.

The Splint coal was used to determine the best settings of the centrifuge 20 for the classification approach. The variables were flow rate, solid concentration and depth of the pool within the centrifuge. Table 2 lists the above parameters for each of the examples S1–S9. Samples were taken and analyzed for particle size distribution, percent solids and ash and sulfur content; Table 3 shows the results.

TABLE 1

FEED SIZE DISTRIBUTION

| PARTICLE SIZE MICRONS | SPLINT BALL MILL PRODUCT WT % | SPLINT BALL MILL PRODUCT CUMULATIVE WT % | ILLINOIS NO. 6 BALL MILL PRODUCT WT % | ILLINOIS NO. 6 BALL MILL PRODUCT CUMULATIVE WT % |
|---|---|---|---|---|
| <6 | 11.1 | 11.1 | 10.7 | 10.7 |
| 6–8 | 5.4 | 16.5 | 3.4 | 14.1 |
| 8–10 | 3.3 | 19.8 | 2.7 | 16.8 |
| 10–15 | 8.1 | 27.9 | 8.4 | 25.2 |
| 15–20 | 7.3 | 35.2 | 6.9 | 32.1 |
| 20–30 | 15.3 | 50.5 | 16.7 | 48.8 |
| 30–38 | 11.2 | 61.7 | 11.2 | 60.0 |
| 38–75 | 18.6 | 80.3 | 23.9 | 83.9 |
| >75 | 19.7 | 100.0 | 16.1 | 100.0 |
| | 100.0 | | 100.0 | |

TABLE 2

SET-UP TEST CONDITIONS

| TEST NO. | FEED RATE gpm | POOL SETTING mm | SOLIDS WT % |
|---|---|---|---|
| S 1 | 3 | 145-DEEP | 30 |
| S 2 | 6 | 145 | 30 |
| S 3 | 9 | 145 | 30 |
| S 4 | 9 | 150 | 30 |
| S 5 | 6 | 150 | 30 |
| S 6 | 9 | 170 | 30 |
| S 7 | 9 | 175 | 30 |
| S 8 | 9 | 175 | 20 |
| S 9 | 12 | 175-SHALLOW | 20 |

TABLE 3

| | | SET-UP TEST RESULTS | | | | | | | | |
|---|---|---|---|---|---|---|---|---|---|---|
| | | WT % PASSING (MICRONS) | | | | | | | WT % | WT % |
| TEST NO | PRODUCT | 75 | 38 | 30 | 20 | 15 | 10 | 6 | SOLIDS | ASH |
| S 1 | CAKE | 81.4 | 61.0 | 49.0 | | | | | 58.6 | 4.1 |
| | CENTRATE | 100 | 100 | 100 | | | | | 1.2 | 14.1 |
| S 2 | CAKE | 79.5 | 58.0 | 49.4 | | | | | 56.2 | 4.0 |
| | CENTRATE | 100 | 100 | 100 | | | | | 4.4 | 7.2 |
| S 3 | CAKE | 81.9 | 58.6 | 52.6 | | | | | 56.4 | 4.0 |
| | CENTRATE | 100 | 100 | 99.3 | | | | | 3.1 | 9.0 |
| S 4 | CAKE | 80.8 | 62.2 | 53.3 | 39.9 | 31.4 | 22.0 | 13.5 | 55.7 | 4.0 |
| | CENTRATE | 100 | 100 | 99.7 | | | | | 3.4 | 6.9 |
| S 5 | CENTRATE | 100 | 99.9 | 94.6 | 91.4 | 87.5 | 76.8 | 55.4 | 8.9 | 3.7 |
| S 6 | CENTRATE | 100 | 100 | 99.5 | | | | | 9.5 | 4.2 |
| S 7 | CENTRATE | 100 | 99.8 | 93.9 | 88.8 | 80.6 | 63.9 | 42.5 | 11.1 | 4.4 |
| S 8 | CENTRATE | 100 | 100 | 99.8 | 99.3 | 93.5 | 75.3 | 48.5 | 6.5 | 5.3 |
| S 9 | CENTRATE | 99.5 | 94.4 | 87.5 | 73.8 | 64.2 | 50.1 | 33.9 | 15.7 | 3.5 |

Samples were taken from the centrifuge cake 27 as well as the centrate 26 during examples S1–S4 and later only centrate samples were analyzed. The centrifuge 20 operates as a decanter where there is a low feed rate and deeper pool settings and this is shown in examples S1–S4. After an increase in the flow rate and a shallower pool setting, the centrifuge 20 operates as a classifier which is assisted in operation by lowering the solids concentration to 20% by weight, it should be noted that the weight percent of ash in Table 3 is on a dry basis. The change from a decanter to a classifier of the centrifuge 20 is indicated by the increase in solids, including coarser particles, which report to the centrate 26. This increase is proportional to a decrease in the ash content of the solids, an indication that cleaner coal particles are recovered with the centrate. However, it should be understood that the purpose of the centrifuge 20 is not to clean the coal in the total material balance sense but to segregate the clean fine particles from the more contaminated larger or more contaminated heavier particles which when reground provide additional clean particles. In this way, continued cycling of material through the bead mill 35 and the centrifuge 20 will eventually provide all materials in the centrate 26, both clean and dirty, but the coal particles will be substantially ash free and the pyrite particles will have low coal content.

That the process is effective is indicated by a grab sample of the plus 30 micron material which had an ash content of 1.5 percent, confirming the selective recovery of coarser but cleaner coal with the centrate 26. The initial tests with the Splint coal was used to provide improved parameters for tests with the Illinois No. 6 coal. The data were obtained using a pool setting of 175 mm, a solids concentration of 20 weight percent and a feed rate of 11 gpm. These parameters were selected for the specific model of Bird centrifuge. It is understood that other centrifuges are available of different sizes, for instance a Sharples or Bretby solid bowl centrifuge may be used in the process with capacities of up to 60 tons per hour. In such an event, the operating conditions of the centrifuge will have to be adjusted so that it operates as a classifier. These adjustments are within the skill of the art.

The test data from the various runs are disclosed in Tables 4 and 5. The data show a successful operation of a solid bowl centrifuge 20 acting as a classifier in the closed circuit which may be continuous or batch with the fine grinding mill 35 operated at approximately 100% circulating load. Again, it is within the skill of the art to upscale the process to accommodate commercial quantities in continuous and steady state conditions. These data show that it is possible to use a solid bowl centrifuge 20 for the classification of finally ground coal at approximately 20 micron size for the largest particles. The data show that this type of classification enhances the selective recovery of coarser and heavier particles to the centrifuge cake 27 with cleaner coal particles and smaller more likely ash- free coal constituents into the centrate 26. The harder coarse coal, more likely containing mineral particles and ash report to the centrifuge cake 27 and are subjected to additional grinding in the bead mill 35. The inventive process improves liberation of the coal and minerals with reduced effort of grinding and avoids over grinding of clean coal particles resulting in a narrower size distribution range for feed coal to the coal agglomeration process hereinbefore discussed.

TABLE 4

| FIRST PASS CLASSIFICATION PARTITION-CURVE | | | | | | |
|---|---|---|---|---|---|---|
| STREAM | COAL LB/MIN | WATER LB/MIN | YIELD WT % | SOLIDS WT % | ASH WT % | SULFUR WT % |
| FEED | 20.5 | 76.8 | | 21.0 | 8.6 | 2.84 |
| CAKE | 18.1 | 15.4 | 89.3 | 54.0 | 8.0 | 2.75 |
| CENTRATE | 2.8 | 60.8 | 10.7 | 4.4 | 13.1 | 1.75 |

| PARTICLE SIZE MICRON 1 | FEED WT % 2 | FEED CUMULATIVE WT % 3 | FINE COAL WT % 4 | FINE COAL Yf = 10.7% REC. WT % 5 Yf *(4) | FINE COAL CUMULATIVE REC. WT % 6 | COARSE COAL WT % 7 |
|---|---|---|---|---|---|---|
| <6 | 10.3 | 10.3 | 13.4 | 1.4 | 1.4 | 6.9 |
| 6–10 | 6.4 | 16.7 | 20.6 | 2.2 | 3.6 | 4.4 |
| 10–15 | 8.5 | 25.2 | 28.0 | 3.0 | 6.6 | 7.8 |
| 15–20 | 6.8 | 32.0 | 15.3 | 1.6 | 8.3 | 8.3 |

TABLE 4-continued

| FIRST PASS CLASSIFICATION PARTITION-CURVE | | | | | | |
|---|---|---|---|---|---|---|
| 20-30 | 16.8 | 48.8 | 17.9 | 1.9 | 10.2 | 16.2 |
| 30-38 | 11.2 | 60.0 | 4.8 | 0.5 | 10.7 | 12.6 |
| 38-75 | 23.9 | 83.9 | 0.0 | 0.0 | 10.7 | 29.9 |
| >75 | 16.1 | 100.0 | 0.0 | 0.0 | 10.7 | 13.9 |
| TOTAL | 100.0 | | 100.0 | 10.7 | | 100.0 |

| PARTICLE SIZE MICRON 1 | COARSE COAL Yc = 89.3% REC. WT % 8 Yc *(7) | CUMULATIVE REC. WT % 9 | CALCULATED FEED WT % 10 (5) + (8) | CUMULATIVE WT % 11 | MEDIAN PARTICLE SIZE 12 | PARTITION NUMBER *100 13 (8)/(10) |
|---|---|---|---|---|---|---|
| <6 | 6.2 | 6.2 | 7.6 | 7.6 | 3.0 | 81.1 |
| 6-10 | 3.9 | 10.1 | 6.1 | 13.7 | 8.0 | 64.1 |
| 10-15 | 7.0 | 17.1 | 10.0 | 23.7 | 12.5 | 69.9 |
| 15-20 | 7.4 | 24.5 | 9.0 | 32.7 | 17.5 | 81.9 |
| 20-30 | 14.5 | 38.9 | 16.4 | 49.1 | 25.0 | 88.3 |
| 30-38 | 11.3 | 50.2 | 11.8 | 60.9 | 34.0 | 95.6 |
| 38-75 | 26.7 | 76.9 | 26.7 | 87.6 | 56.5 | 100.0 |
| >75 | 12.4 | 89.3 | 12.4 | 100.0 | 100.0 | 100.0 |
| TOTAL | 89.3 | | 100.0 | | | |

TABLE 5

| PARTICLE SIZE MICRONS | BEAD MILL GRINDING FEED WT % | FEED CUMULATIVE WT % | PRODUCT WT % | PRODUCT CUMULATIVE WT % |
|---|---|---|---|---|
| <6 | 28.2 | 28.2 | 47.2 | 47.2 |
| 6-10 | 9.0 | 37.2 | 15.2 | 62.4 |
| 10-15 | 6.4 | 43.6 | 12.0 | 74.4 |
| 15-20 | 3.0 | 46.6 | 9.0 | 83.4 |
| 20-30 | 3.0 | 49.6 | 12.0 | 95.4 |
| 30-38 | 15.4 | 65.0 | 2.8 | 98.2 |
| 38-75 | 19.9 | 84.9 | 1.8 | 100.0 |
| >75 | 15.1 | 100.0 | 0.0 | 100.0 |
| TOTAL | 100.0 | | 100.0 | |

While there has been disclosed what is considered to be the testing arrangement of the present invention, it is understood that various changes in the details may be made without departing from the spirit, or sacrificing any of the advantages of the present invention.

The embodiments of the invention in which an exclusive property or privilege is claimed are defined as follows:

1. A process for preparing coal for use as a fuel, comprising grinding coal particles in the presence of water to form a coal-water slurry having solid coal particles with a particle size not exceeding about 80 microns, classifying the ground coal-water slurry in a solid bowl centrifuge to provide a centrate containing solid particles with a particle size distribution of from about 5 microns to about 20 microns and to provide a centrifuge cake of solids having a particle size distribution of from about 10 microns to about 80 microns, and regrinding the classifier cake, wherein more than about 50% of the slurry particles are larger than 6 microns.

2. The process of claim 1, wherein the coal-water slurry is continuously prepared.

3. The process of claim 2, wherein the centrifuge cake is reground to provide particle sizes not to exceed about 50 microns.

4. The process of claim 1, wherein the solids concentration in the centrate is greater than about 10% by weight.

5. The process of claim 1, wherein the process is continuous and the solids concentration in the centrate is maintained greater than about 10% by weight.

6. A continuous process for preparing coal for use as a fuel, comprising grinding coal particles in the presence of water to form a coal-water slurry having solid coal particles with a particle size not exceeding about 80 microns, transporting the coal-water slurry to a solid bowl centrifuge, classifying the ground coal-water slurry in a solid bowl centrifuge to provide a centrate containing solid particles with a particle size distribution of from about 5 microns to about 20 microns and to provide a centrifuge cake of solids having a particle size distribution of from about 10 microns to about 80 microns, and regrinding the classifier cake, and introducing the reground cake with fresh feed to the solid bowl centrifuge for classification to produce a centrate having solids with a particle size distribution of from about 5 microns to about 20 microns, wherein more than 50% of the slurry particles are larger than 6 microns.

7. The process of claim 6, wherein the classifier cake is ground in a bead mill and mixed with water before introduction to the classifier.

8. The process of claim 7, wherein the classifier cake is ground to produce a size distribution wherein a majority of particles have sizes less than about 20 microns.

9. The process of claim 1, wherein the cake is continuously introduced to a mill for grinding and the reground cake is continuously introduced to the classifier.

10. A continuous process for preparing coal for use as a fuel, comprising grinding coal particles in the presence of water to form a coal-water slurry having solid coal particles present in an amount of about 30% by weight with a particle size not exceeding about 80 microns, classifying the ground coal-water slurry in a solid bowl centrifuge to provide a centrate containing solid particles present in a concentration greater than about 10% by weight with a particle size distribution not to exceed about 20 microns and to provide a centrifuge cake of solids having a particle size distribution of from about 10 microns to about 80 microns, and regrinding the classifier cake, and introducing the reground cake having particle sizes not exceeding about 50 microns and water with fresh feed to the solid bowl centrifuge for classification to produce a centrate having solids with a particle size distribution not to exceed about 20 microns, wherein more than 50% of the slurry particles are larger than 6 microns.

11. The continuous process of claim 10, wherein the slurry is formed in a rod mill to provide coal particle sizes not greater than about 80 microns.

12. The continuous process of claim 10, wherein the centrifuge cake is reground in a bead mill to provide fine particles to the classifier.

13. The continuous process of claim 10, and further comprising transferring the centrate to a separator to separate ash and minerals present from the coal-water slurry.

14. The continuous process of claim 10, wherein the centrate solids concentration is greater than about 15% by weight.

15. The continuous process of claim 6, wherein about 15% of the total of the centrate solids have particle sizes in the range of from about 6 microns to about 10 microns.

16. The continuous process of claim 6, wherein about 12% of the total of the centrate solids have particle sizes in the range of from about 10 microns to about 15 microns.

17. The continuous process of claim 6, wherein about 9% of the total of the centrate solids have particle sizes in the range of from about 15 microns to about 20 microns.

18. The continuous process of claim 6, wherein about 12% of the total of the centrate solids have particle sizes in the range of from about 20 microns to about 30 microns.

19. The continuous process of claim 6, wherein about 35% of the total of the centrate solids have particle sizes in the range of from about 6 microns to about 20 microns.

20. The continuous process of claim 6, wherein about 50% of the total of the centrate solids have particle sizes in the range of from about 6 microns to about 30 microns.

* * * * *